Dec. 18, 1956 A. LARSON ET AL 2,774,100
ADJUSTABLE SPRING SASH BALANCE
Filed Aug. 30, 1952 2 Sheets-Sheet 2
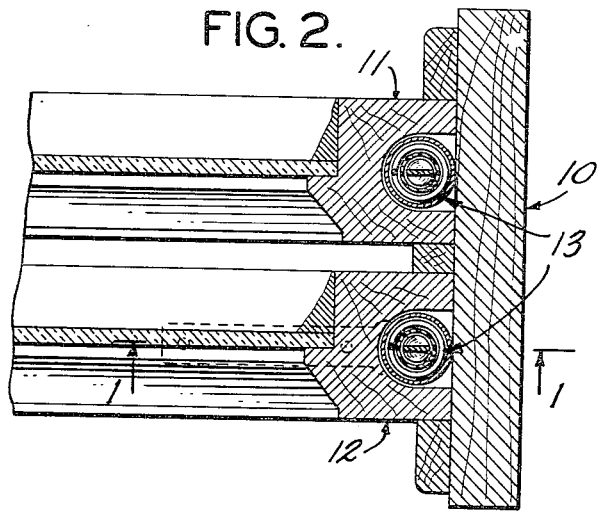
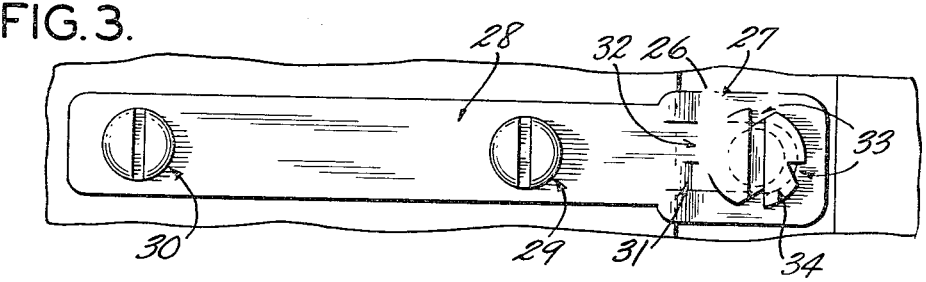
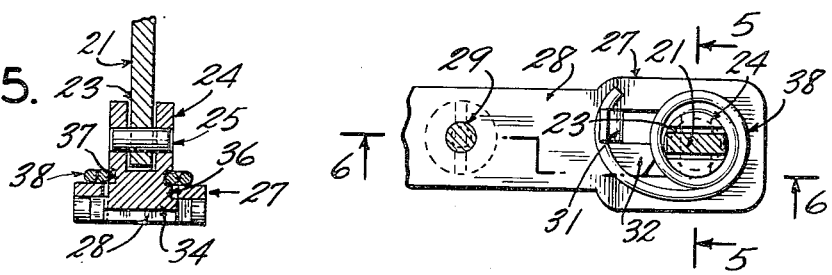
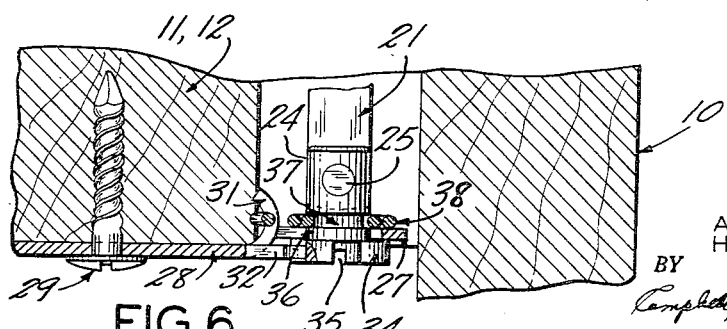
INVENTORS.
ALGOT LARSON &
HOWARD A. SMITH
BY
*Their* ATTORNEYS United States Patent Office 2,774,100
Patented Dec. 18, 1956

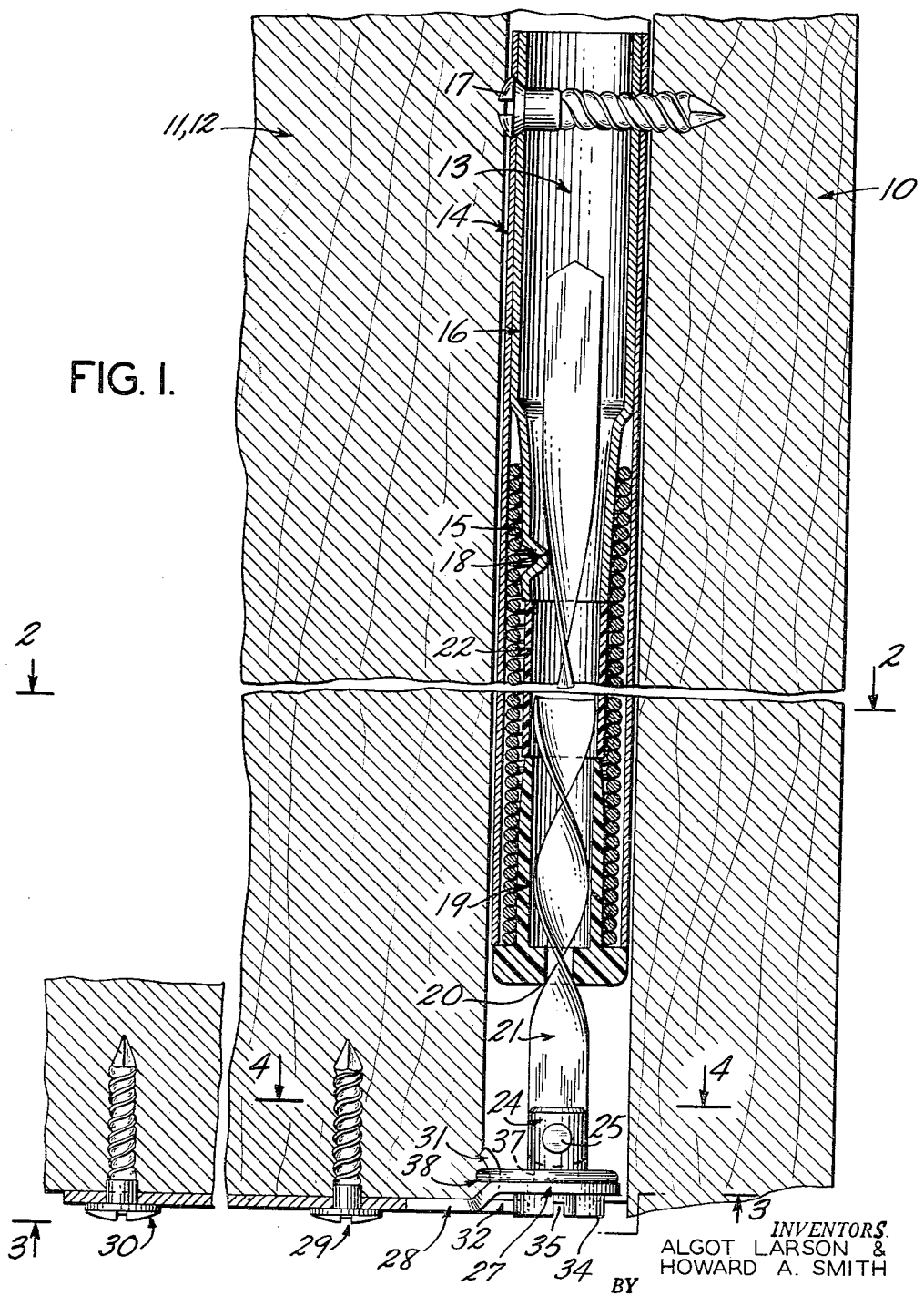

2,774,100

ADJUSTABLE SPRING SASH BALANCE

Algot Larson, Stamford, Conn., and Howard A. Smith, Chicago, Ill., assignors to Unique Balance Co., Inc., New York, N. Y., a corporation of Illinois Application August 30, 1952, Serial No. 307,232

6 Claims. (Cl. 16—197)

The present invention relates to spiral-operated spring sash balances and embodies more specifically an improved structure whereby the tension of the balance spring may be adjusted.

Ever since the introduction of tubular spiral operated spring sash balances attempts have been made to devise a suitable means for pre-tensioning the power spring of the balance mechanism to facilitate the installation thereof and to insure the proper tensioning of the mechanism for a desired operation. Installation is greatly simplified when the tension in the power spring of the balance mechanism closely approximates the load of the window sash since the balance mechanism need then only be installed and does not require extensive adjustments.

Also desirable is an easy and simple means to make such minor adjustments of the power spring tension as might be required to reach the final correct balance after installation or to correct changes in the tension that might result from the use of the window. These minor adjustments must be capable of being made without disturbing the woodwork or marring the finish of the frame or sash.

Past efforts (which employed ratchet mechanisms and other means) at the solution of these problems have proven to be unsatisfactory. Some of these old means have required special tools or extra parts which were easily lost or mislaid and which were wasteful of labor and materials.

In those past attempts where ratchets were used to pretension and to adjust the tension of the power spring of the balance mechanism, the opposing surfaces of the ratchet mechanism have engaged in the horizontal plane perpendicular to the plane of the tensile force of the power spring. The opposing surfaces of the ratchet mechanism were held in engagement by the tension of the power spring, and as a sudden movement of the window sash caused a sharp reduction in the tension exerted by the power spring the opposing surfaces would become disengaged and the torsional force of the power spring thereby released. To overcome this defect, second vertical springs were employed in the balance mechanism, but their purpose was solely to hold the opposing surfaces of the ratchet in engagement and they did not aid in the balance of the window sash. These supplementary springs were therefore uneconomic and resulted in a more complicated balance structure.

The present invention accomplishes the above objects together with other advantages which will be more readily apparent from the following detailed description made with reference to the accompanying drawings.

In the drawings:

Figure 1 is a view in elevation taken on line 1—1 of Figure 2 of a preferred embodiment of the invention as applied to a window assembly, showing in partial section the tubes and power spring;

Figure 2 is a view in transverse crosss-section taken on line 2—2 of Figure 1 and looking in the direction of the arrows;

Figure 3 is a view taken on line 3—3 of Figure 1 and looking in the direction of the arrows, showing the opposing surfaces of the ratchet members in engagement; and Figure 4 is a view in partial section taken on line 4—4 of Figure 1 and looking in the direction of the arrows, showing the convolute spring holding in engagement the opposing surfaces of the ratchet mechanism;

Figure 5 is a cross-sectional view taken on line 5—5 of Figure 4 and looking in the direction of the arrows; and Figure 6 is a view in partial section showing the installed sash attachment plate and ratchet assembly, taken on line 6—6 of Figure 4 and looking in the direction of the arrows.

Referring to the drawings, indicated at Figure 2 is a window frame 10 and upper and lower sashes 11 and 12, respectively. For each of the sashes 11 and 12 there is provided a sash balance mechanism 13, which mechanism is shown in greater detail in Figure 1.

The sash balance mechanism 13 comprises a tube 14 within which a coiled torsion spring 15 is received. The upper end of the coiled spring 15 is secured to a sleeve 16, which, together with the tube 14, is fixedly attached to the frame 10 by a drive screw 17 or other suitable means. Formed in the sleeve 16 is an inwardly directed detent 18. The coiled spring 15 is secured at its lower end to a nut 19 formed with a slot 20, within which is received a spiral rod 21. Spaced between the sleeve 16 and the nut 19 and within the coiled spring 15 is a tube 22 made of fibre or the like to eliminate noise which may be caused by the metal to metal contact during operation.

The balancing and lifting power of the balance mechanism 13, in accordance with the conventional operation of this type of sash balance, is dependent upon the tension of the coiled spring 15 which is varied by the spiral rod 21. An equal lifting power at all points of the run of the sash 11 or 12 is maintained by the varying pitch of the spirals of the rod 21.

The spiral rod 21 is attached in a slot 23 formed in a ratchet post 24 by a hinge pin 25. The ratchet post 24 is received in an elongated slot 26 formed in an offset end portion 27 of a sash attachment plate 28. The sash attachment plate 28 is attached to the bottom of the sash 12 by drive screws 29 and 30 or any other suitable means.

The sash attachment plate 28 is formed of sheet metal with the offset end portion 27 having formed therein the elongated slot 26 which is of sufficient width to slidably receive the ratchet post 24. Also formed at the offset line of the sash plate 28 are a bent-up prong 31 and an opposing pawl 32. The opposing pawl 32 is not offset, but is in the same plane as the sash attachment plate 28 so as to coincide with notches 33 spaced along the circumference of a head 34 of the ratchet post 24. Also formed in the head 34 is a slot 35 adapted to receive a screwdriver or other similar instrument. Spaced apart from the head 34 of the ratchet post 24 so as to allow a bearing surface 36 is an annular groove 37. Fitted in the annular groove is a convolute spring 38, the open end of which is engaged with the bent-up prong 31 of the sash attachment plate 28. The convolute spring 38 serves the dual purposes of locking the ratchet post 24 in the elongated slot 26 and normally urging the opposing pawl 32 and the notches 33 of the ratchet post head 34 into engagement while allowing the lateral movement of the ratchet post 24 in the elongated slot 26 during adjustment of the balance mechanism 13.

The bent-up prong 31 receives the opened end of the convolute spring 38 and also serves as a guide or stop to locate the sash attachment plate 28 against the sash, the sprong 31 fitting against the inner edge of the sash grooves, as shown in Figure 6.

The balance mechanism 13 is pretensioned in the factory by withdrawing the spiral rod 21 past the inwardly directed detent 18 in the sleeve 16 and, while the sleeve 16 and tube 14 are held stationary, turning the sash attachment plate 28 and spiral rod 21 a predetermined number of turns in the direction increasing the tension in the coil spring 15. The spiral rod 21 is then returned into the tube until the upper end of the rod 21 passes the inwardly directed detent 18. The locking detent 18 prevents the rotation of the spiral rod 21 thereby retaining the tension imparted to the coiled spring 15.

The balance mechanism 13 is installed in the vertical grooves in the sashes 11 and 12 with the sash attachment 28 pivoted so that it is parallel to the axis of the mechanism 13 and having its flat bottom side directed toward the frame jamb 10. The upper end of the mechanism 13 is secured at the head of the jamb 10 by the drive screw 17. The lower sash 12 is then raised to its highest elevation, at which position the end of the vertically pivoted sash attachment 28 should extend somewhat below the bottom edge of the sash 12. The sash attachment 28 and spiral rod 21 is then pulled down to a point where the sash attachment plate 28 can be pivoted to a horizontal position and, with the bent-up prong 31 against the inner edge of the groove in the sash 12, attached to the lower edge of the sash 12 by drive screws 29 and 30. The distance between the locking detent 18 and the top of the spiral rod 21, as indicated on Figure 1, when the spiral rod 21 is fully advanced in the balance mechanism 13 is sufficient to allow a margin of safety in this installation procedure.

This installation operation is repeated on the other side of the sash 12 which then can be raised or lowered to any level desired. When the sash 12 is lowered, the end of the spiral rod 21 passes below the locking detent 18 in the sleeve 16 and the arrested torsional tension in coiled spring 15 is released and will counter-balance the sash 12 at any point.

If after installation it is necessary to increase the tension of the coiled spring 15, the spiral rod 21 is turned in the direction which increases the tension by a screwdriver inserted in the slot 35 in the head 34 of the ratchet post 24. The point of the pawl 32 as it slides out of the ratchet notch 33 and along the circumference of the ratchet post head 34 forces the ratchet post 24 back in the elongated slot 26 against the force exerted by the convolute spring 38 until the pawl 32 reaches the next notch 33 where the force of the convolute spring 38 will urge the pawl 32 and notch 33 into engagement. This operation is continued until the proper increased tension is secured.

To reduce the tension in the coiled spring 15, external pressure is exerted against the ratchet head 34 to force it in the elongated slot 26 away from the offset line so that the pawl 32 and the notch 33 are disengaged. The torsion of the coiled spring 15 will turn the ratchet post 24 until the next notch 33 is reached and the convolute spring 38 forces the pawl 32 and notch 33 into engagement. This process is repeated until the desired tension of coiled spring 15 is secured.

From the foregoing it can be seen that factory pretensioning is a great convenience and source of economy of time and labor to the building trade. The more accurate pre-tension adjustment made by the workers skilled in the manufacture of the balance mechanism lessens the danger of destructive adjustment being made during installation. The ease and facility with which adjustments may be made after installation without marring the woodwork or finish of the window is obvious from the foregoing.

While the invention has been described with reference to the specific structure shown in the drawings, it is not to be limited save as in the appended claims.

We claim:

1. In a window sash balance, mechanism for adjusting the angular position of the spiral rod which determines the tension of the power spring, said mechanism comprising, a sash attachment plate having one end formed to define an elongated slot therein, a post received within the slot and adapted to have the lower end of the rod secured thereto, said post having an annular groove therein on one side of the slot, ratchet and pawl mechanism having the two component parts thereof respectively secured to said post and to said plate at the inner end of said slot, a tension spring with one end anchored to said plate at the inner end of said slot and the other end received in said groove, said spring both locking said post in assembled position and urging said post towards the inner end of said slot to maintain said ratchet and pawl in engagement, and means to turn the post in the slot.

2. In a window sash balance, mechanism for adjusting the angular position of the spiral rod which determines the tension of the power spring, said mechanism comprising, a sash attachment plate having one end which is offset from the plane of said plate and which has formed therein a lengthwise running slot, said plate also having a pawl portion extending in said plane from the base of said offset end to project within the space of said slot in a lengthwise and widthwise sense, a post received within said slot and adapted to have the lower end of said rod secured thereto, said post having a head and an angular groove disposed, respectively, on the sides of said slot towards and away from said plane, said head having notches formed therein to act in said plane as ratchets with said pawl, and a flat spiral spring with one end anchored to said plate inward of said post and the other end received in said annular groove, said head and the received end of said spring being each larger widthwise than said slot to accordingly lock said post and end together to forestall movement of said post in said slot towards and away from said plane, the tension of said spring maintaining said pawl and said notches in firm engagement.

3. A mechanism as in claim 2 wherein said sash attachment plate is oriented with respect to the power spring so that the offset end of said plate is offset towards the power spring.

4. Mechanism as in claim 3 wherein said attachment plate has a prong formed therein at the inner end of said slot, said prong extending at an angle to said plane towards said power spring, said prong both providing the plate anchor for said spiral spring and providing a stop for positioning said plate in proper location with respect to the sash.

5. Mechanism for adjusting the power spring of a window sash balance having a nut secured to the power spring, said nut being engaged by a spiral rod adapted to be secured to a window sash, the adjusting mechanism including a sash attachment plate having one end formed to define a slot therein, said plate being adapted to be secured to a window sash, a post carried by the lower end of the spiral rod and received within the slot, ratchet and pawl mechanism between the post and slot, a spring anchoring element disposed on said plate between said post and the rest of said plate, a tension spring engaging both the post and the element in a manner tending to draw the two together to urge the post toward one end of the slot to maintain the ratchet and pawl in engagement, and means to turn the post in the slot.

6. Mechanism for adjusting the power spring of a window sash balance having a nut secured to the power spring, said nut being engaged by a spiral rod adapted to be secured to a window sash, the adjusting mechanism including a sash attachment plate having one end formed to define a slot therein, said plate being adapted to be secured to a window sash, a post carried by the lower end of the spiral rod and received within the slot, said post having an annular groove formed therein, ratchet and pawl mechanism between the post and slot, a spring received within said groove to lock the post in assembled position and to urge the post toward one end of the slot to maintain the ratchet and pawl in engagement, and means to turn the post in the slot.

References Cited in the file of this patent

UNITED STATES PATENTS

| | | |
|---|---|---|
| 491,114 | Johnson | Feb. 7, 1893 |
| 1,926,951 | Larson | Sept. 12, 1933 |
| 2,365,156 | Viehweger | Dec. 19, 1944 |
| 2,415,614 | Tappan | Feb. 11, 1947 |
| 2,565,804 | De Vries et al. | Aug. 28, 1951 |
| 2,580,705 | Tappan | Jan. 1, 1952 |
| 2,597,459 | Dickinson et al. | May 20, 1952 |
| 2,602,958 | Brown | July 15, 1952 |
| 2,604,655 | Peremi | July 29, 1952 |
| 2,622,267 | Peremi | Dec. 23, 1952 |
| 2,633,600 | Larson | Apr. 7, 1953 |